US008700574B2

(12) United States Patent  (10) Patent No.: US 8,700,574 B2
Thomson et al.  (45) Date of Patent: Apr. 15, 2014

(54) POUROVER JOURNALING

(75) Inventors: Steven S. Thomson, San Diego, CA (US); Muralidhar Reddy Akula, San Diego, CA (US); Ryan Moore, San Diego, CA (US); Vineet Thanedar, San Diego, CA (US)

(73) Assignee: Omnitracs, LLC, San Diego, CA (US)

( * ) Notice: Subject to any disclaimer, the term of this patent is extended or adjusted under 35 U.S.C. 154(b) by 545 days.

(21) Appl. No.: 12/053,157

(22) Filed: Mar. 21, 2008

(65) Prior Publication Data

US 2009/0240744 A1   Sep. 24, 2009

(51) Int. Cl.
G06F 17/30   (2006.01)

(52) U.S. Cl.
USPC ........... 707/651; 707/640; 707/650; 707/652; 707/653; 707/654; 707/E17.007

(58) Field of Classification Search
None
See application file for complete search history.

(56) References Cited

U.S. PATENT DOCUMENTS

| 7,403,946 | B1 * | 7/2008 | Taylor | 707/612 |
|---|---|---|---|---|
| 7,567,989 | B2 | 7/2009 | Yatabe et al. | |
| 7,653,665 | B1 * | 1/2010 | Stefani et al. | 714/19 |
| 2002/0188624 | A1 * | 12/2002 | Landin | 707/203 |
| 2006/0053139 | A1 * | 3/2006 | Marzinski et al. | 707/101 |
| 2007/0112893 | A1 * | 5/2007 | Okada et al. | 707/204 |
| 2007/0255763 | A1 * | 11/2007 | Beyerle et al. | 707/201 |
| 2007/0282921 | A1 * | 12/2007 | Atluri et al. | 707/202 |

FOREIGN PATENT DOCUMENTS

WO   WO 2006108260 A1   10/2006

OTHER PUBLICATIONS

IBM, Calypso file system and distributed lock manager, http://www.research.ibm.com/caly, last modified Jun. 5, 1995 (2 pages).
Portal; the Guide to Computing Literature, Caching in the Sprite network file system; http://portal.acm.org/citation.cfm? id=42183, ACM Transactions on Computer Systems (TOCS), vol. 6, Issue 1, pp. 134-154,published Feb. 1988, ACM, New York, New York, USA (14 pages).
Portal; the Guide to Computing Literature: Scale and performance in a distributed file system, http://portal.acm.org/citation.cfm?doid=35037.35059, ACM Transactions on Computer Systems (TOCS), vol. 6; Issue 1, pp. 51-81, published Feb. 1988, ACM, New York, New York, USA (27 pages).
Veritas Cluster Server, http://www.symantec.com/enterprise/products/overview.jsp;jsessionid=760C4FA6965FC1E97B71216492B3528D?pcid=2258&pvid=20_1, 1995-2008 Symantec Corporation, (2 pages).
Randae, Sandeep, Asynchronous Replication, Online Journal, http://www.linuxjournal.com, Jan. 28, 2004, (7 pages).
Linbit, http://www.linbit.com/en/drbd, Online Article, undated, (1 page).
International Search Report and Written Opinion-PCT/US2009/034458, International Search Authority-European Patent Office-May 20, 2009.
Wakahara Y: "An Approximate Method for Minimizing Communications Cost and Time for Replication Update of Distributed Databases" Electronics & Communications in Japan, Part I-Communications, Wiley, H0b0ken, NJ, US, vol. 85, No. 4, Part 01, Jan. 1, 2002, pp. 61-70, XP001102647 ISSN: 8756-6621.

* cited by examiner

*Primary Examiner* — Shyue Jiunn Hwa
(74) *Attorney, Agent, or Firm* — Arent Fox LLP

(57) ABSTRACT

PourOver is the process of replicating databases across clusters, in order to achieve real and/or near real-time database consistency between clusters (e.g., continually provide the ability to construct a consistent database on the alternate cluster that is up to date within a few minutes worth of transactions).

31 Claims, 11 Drawing Sheets

POUROVER JOURNALING

BACKGROUND

1. Field

The present invention relates generally to database backup systems, and more specifically to an apparatus and method of replicating and storing backup databases in real-time or near real-time.

2. Background

PourOver is a method and system that replicates continually generated transaction data to a backup location in order to achieve real-time or near real-time database consistency between the active and backup databases. It can be used to construct a consistent backup database that is up-to-date (real-time) or within a few minutes' worth of transactions (near real-time). The backup location can be situated at a remote site.

High-availability systems that handle millions of transactions per day require that the data be reliably and continuously replicated to backup locations. This is so in the situation of a disaster where the running production site has failed or even potentially become inaccessible, the backup site can be brought up with no loss (real-time) or almost no loss of transaction data (near real-time).

An ideal system is a real-time system that operates constantly with extremely low downtime requirements, where inter-related data is stored across multiple files and distributed across multiple machines and disk drives. Further, due to high availability requirements a remote backup site needs to be used that replicates the primary site. When failing over from one site to another, either as a planned and/or unplanned action, the files need to be replicated in a consistent manner on the backup site in real or near real time with minimal or no data loss. Once, the files are restored on the backup site, that site can preferably take over operation from the site that was previously being backed up.

Presently, there are some commercial databases that implement database replication across distributed locations. However, they do not handle the general case of replicating arbitrary inter-related files, across multiple file-systems/machines/disks. In addition, some operating systems (and disk subsystems) can mirror data across distributed sites. This requires that all the files be on the same mirror, that the mirror gets all the writes in order from the operating system and that the mirror replicates in the order of the writes to ensure that all the files are consistent. Typically, when a transaction is lost the mirror needs to be rebuilt and while in the rebuilding process the mirrored site may be in an inconsistent state and may not be available. Some journaled file systems implement the required functionality, but not on a distributed basis.

Some of these prior art systems include fault tolerant clustered file systems, such as Calypso as described at http://www.research.ibm.com/caly, Sprite as described at http://portal.acm.org/citation.cfm?id=42183 and AFS as described at http://portal.acm.org/citation.cfm?doid=35037.35059. These systems implement the required functionality within a cluster but not across clusters. Veritas Cluster Server, as described at http://www.symantec.com/enterprise/products/overview.jsp?pcid=1019&pvid=20_1, implements the required functionality by combining a Veritas file system and volume replicator. The Veritas Cluster Server uses a Veritas file system to track all file modifications and uses a volume replicator to replicate any modified data to the remote cluster. The replicated data is not journaled, but is applied immediately to the remote cluster. Pratima, as described at http://www.linuxjournal.com/article/7265, and DRDB, as described at http://www.linbit.com/en/drbd, implements the required functionality at the block level using a customized Linux device driver. The Pratima and DRDB systems use custom Linux device drivers to replicate block updates across remote clusters. The replicated data is not journaled, but is applied immediately to the remote cluster.

There are several disadvantages and shortcomings of these prior art systems. The Veritas Cluster Server, Pratima and DRDB systems are volume based (not file based). In addition, these systems do not maintain journals, so during a rebuild, the remote cluster is not in a consistent state and cannot be used as a backup. This creates a potentially large window in time in which no backup cluster is available for fail over and potentially cannot be made consistent in the event of a network failure during this window (this can be overcome by replicating to a third location, but requires a third copy of the data and the network resources to make the extra copy). The Veritas Cluster Server requires a Veritas file system and is not currently available for virtual memory system (VMS) and the Pratima and DRDB systems require a Linux O/S and a customized device driver and is also is not available for VMS. These systems require the use of proprietary databases and specialized hardware. Further, these systems are not universal. They cannot back up multiple inter-related files across file systems or machines, they cannot solve the problem of retaining the ability to use the previous backup while rebuilding (unless two backup sites are used and only one site is rebuilt at a time) and they do not ensure file consistency to a specific point in time

SUMMARY

Aspects disclosed herein address the above stated needs by providing a system, method and computer program for replicating a system's data. Periodically, the databases on the production site are copied over to the backup site. This process is called a snapshot. PourOver replicates the system's data by applying a snapshot/journaling mechanism. In essence the "snapshot" is taken periodically of all of the read/write databases (across all file-systems/machines on the production site), and changes to the databases (across all file-systems/machines on the production site) are saved in journal files, which contain the delta between the database snapshot and the current state of the actual databases. All transactions are recorded or journaled in real or near real-time and are sent over the network to the backup site immediately. Each recorded transaction "belongs" to the last recorded snapshot. The process replicates the databases across clusters, in order to achieve real and/or near real-time database consistency between clusters (e.g., continually provide the ability to construct a consistent database on the alternate cluster that is up to date within a few minutes worth of transactions). In order to replicate across clusters the latest snapshots are copied, while the journals are streamed in real or near real-time to the destination cluster. Due to the desire to limit the impact on the existing network management computer (NMC) architecture, one aspect uses near real-time replication. Real-time replication requires the NMC processes be changed to use an asynchronous database update model, which is a major change to the current process architecture of the NMC. Once the copying of all the databases that compose a snapshot is complete, the destination cluster can rebuild the databases by replaying the journal files (i.e., applying the changes described in the journal files to the snapshot database files). Thus, the timeliness of the destination database is dependent upon the delay between the streaming of the journal records and the time of their insertion into the journal file.

The backup site processes collect the transactions, and stores them in configurable locations in the order that they were generated. Each transaction is then replayed onto a snapshot database in order to rebuild the database that is up-to-date with the production database.

The entire process beginning with recording of the transactions up to replaying them is streamlined and enables replication of data in near real-time. The backup site itself can be operated in a high-availability mode where standby backup processes take over in the event that the "active" backup processes fail.

The aspects of the present invention provide continuously backing up of a set of potentially inter-related files, such that they can be restored to a specific moment in time, thus ensuring their inter-consistency. The backup location may be to a local and/or remote site/cluster. The time delay between sending data between sites may exceed the maximum acceptable transaction delay (i.e., only near-real time replication). The files can be distributed across one or more machines/computers and/or disk drives. The backup is made in real and/or near-real time, even when performed to a remote site. The backed up files can be used in real/near-real time at the backup site. When a transaction is lost and a new backup is being started, the previous backup is available until the new backup is in a consistent state. Lost transactions automatically start a new consistent backup set. Once a backup is in a consistent state it remains in the backup until a transaction is lost. No transactions are lost in the normal replication process.

In a second implementation, normal NMC I/O operation doesn't wait for the journal record to be made persistent, so as to not introduce extra latency into normal NMC operations.

Given that NMC operations are mostly I/O bound, and that I/O resources on the active cluster should be spared for normal NMC operations, this implementation transfers the journal records to a backup node where they are made persistent. In this implementation, journaling modules have to deal with a stream (of journal records) that is not flow controlled, because of which, journaling will keep up only to the extent to which "communication resources to backup node" and "I/O resources on backup node" support it. Hence, resource planning is critical to ensuring successful journaling.

This implementation uses Transmission Control Protocol, TCP, connections to transfer records to cluster-wide journaling process, JRNLC, which can be run on the backup node. When there is a backup node, which can be used, this design slightly increases the CPU usage on the active node, but have no additional impact on I/O usage. This implementation allows running journaling on the production node, provided that the CPU & I/O resources are adequate. Therefore, in this implementation, NMC application transfers DB updates to a system journaling process, JRNLS which transfers the records to JRNLC over TCP/IP connections, JRNLS are configured for memory-buffer or file-buffer mode, multiple JRNLSs are run to overcome throughput and ramp-up limits of a single TCP/IP connection, JRNLC writes to multiple JRNL files to overcome maximum IO rate limits of a single file (i.e., single spindle or group), JINTG reads from multiple JRNL files, a helper process, JSTRM copies any database files that need to copied to the backup cluster. JRNLC is set-up for either local or remote mode. A system snapshotting process, JSNAP is responsible for making a copy of databases and performing consistency checks.

The disclosed aspects support arbitrary file replication like Disk/Volume replication and journal files like structured query language (SQL) databases. It also maintains prior replicated files in a consistent state, even during a rebuild (snapshot), limits disk space by automatically taking snapshots based on time/records replicated and removing old backup sets that are no longer required. The system can replay journals in order from older snapshots, is capable of sustaining high transaction rates with small (~1 k byte) objects and works on VMS.

The disclosed implementations provide a real and/or near real-time backup of a distributed set of files between clusters and ensure that a distributed set of backed up files are consistent with respect to a point in time within a backup set.

An advantage of the aspects of the present invention is that it provides continuous backup with no windows in which the backup site cannot be restored to the last consistent state.

Another advantage of the disclosed aspects of the present inventions is that it allows the backup site to be continuously updated to the latest consistent state available.

Yet another advantage of the aspects of the present invention is that it allows the backup site to be rebuilt to any point in time at which a consistent state is available for a snapshot to the point in time that a transaction was lost, up to the latest available record.

Another advantage of the aspects of the present inventions is that it allows journals to be replayed in order from older snapshots.

Another advantage of the aspects of the present inventions is that it replicates only the changed records of a file in the journals.

Another advantage of the aspects of the present inventions is that it copies only the journaled files (not a whole volume) on a snapshot.

Another advantage of the aspects of the present inventions is that it provides fast replication even for large numbers of small records.

Another advantage of the aspects of the present inventions is that it does not add any significant disk I/O load to the local cluster.

Another advantage of the aspects of the present inventions is that it does not require any special hardware.

Another advantage of the aspects of the present inventions is that it is not an operating system or file system dependent

DETAILED DESCRIPTION

Figure 1:
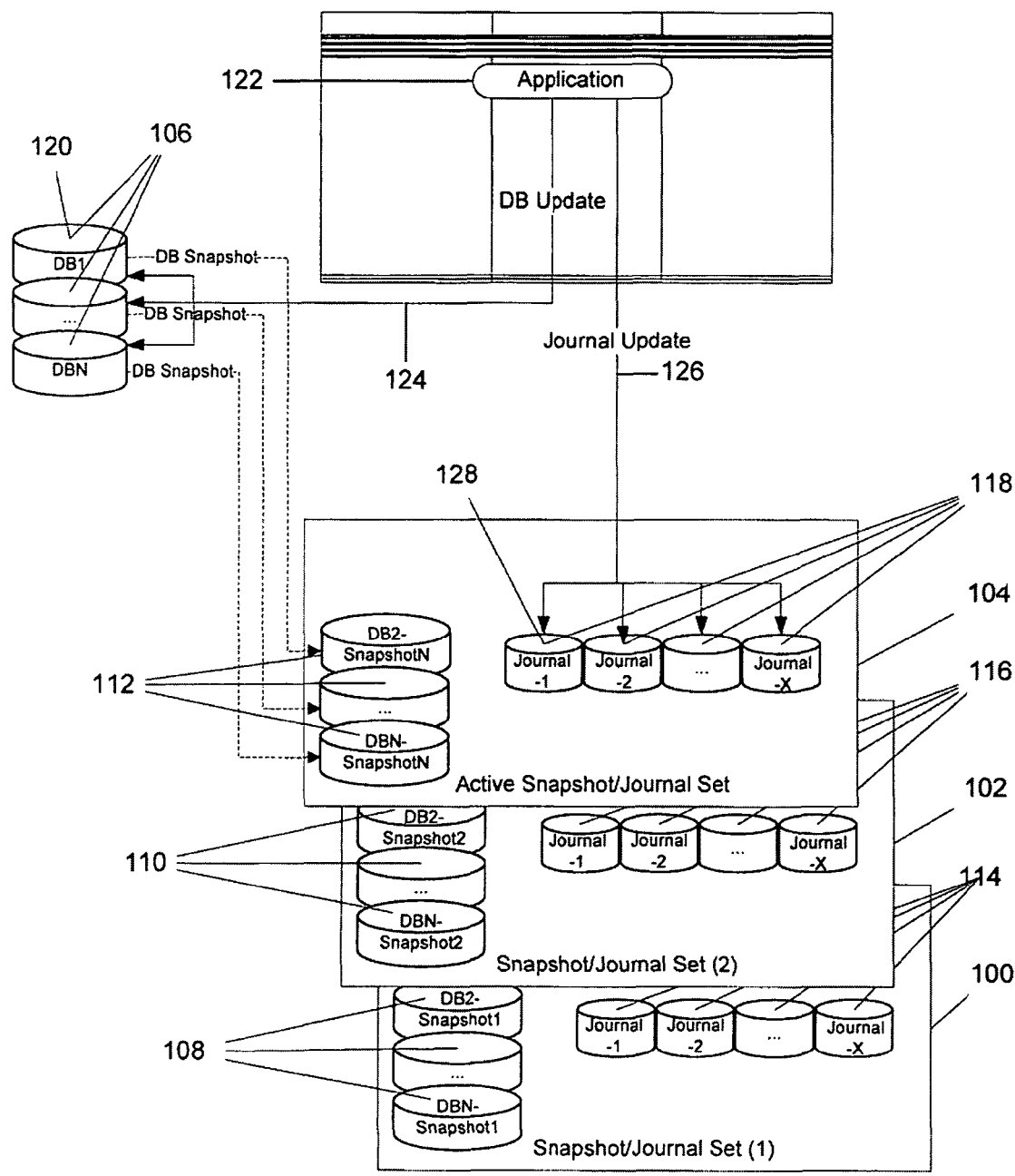
FIG. 1 is a diagram showing a snapshot/journal set.

FIG. 1 shows a typical snapshot/journal set. Shown is snapshot/journal set (1) 100, snapshot/journal set (2) 102 and active/snapshot journal set 104. A "snapshot/journal set" consists of a snapshot 108, 110, 112 of every database 106 that is desired to be dynamically synchronized between two clusters (e.g., the read-write databases) and a set of journal files 118 that contain the changes to the databases since the "snapshot/journal set" creation was requested. The requested creation time always precedes the time of the database snapshots; therefore journal files 118 may contain entries prior to even the creation of a snapshot for the database that the journal entry refers to. From the point in time that the snapshot of all databases 106 is complete and all the database changes up to and including the point in time that the completed database snapshot have been recorded in the journal files onward, the original database can be reconstructed by taking the snapshot of that database and applying (playing back) all of the changes to the database as recorded in journal files 118. Prior to completing a snapshot of all databases 106, databases 106 can be reconstructed from a previous snapshot/journal set 100 by first copying the databases for the snapshot/journal set 108 and then playing back associated journal files 114, all intervening journal files 116 in snapshot/journal set creation order up to and including the latest set of journal files 118 onto the copied databases, assuming journaling was not disabled at any time between the snapshots.

As database updates 124 are made, a description of the changes are appended 126 to journal files 118 in the active snapshot/journal set 104, which will grow until the point in time that a new snapshot is taken. Once copying of databases 106 for a snapshot is complete, databases 112 have been replicated across clusters and associated journal files 118 have been streamed to the point in time that the database replication is completed, previous snapshot journal sets 100, 102 can be deleted. Therefore, in order to reduce disk space consumption, periodic snapshots should be made by the journaling components based upon the size of the journal files and/or the time interval between snapshots. It is also desirable to make snapshots in order to reduce the time to reconstruct the databases from journal files 118, since the time to reconstruct a database from a journal is in direct proportion to the number of records in journal files 118 and the size of databases 106.

Figure 2:
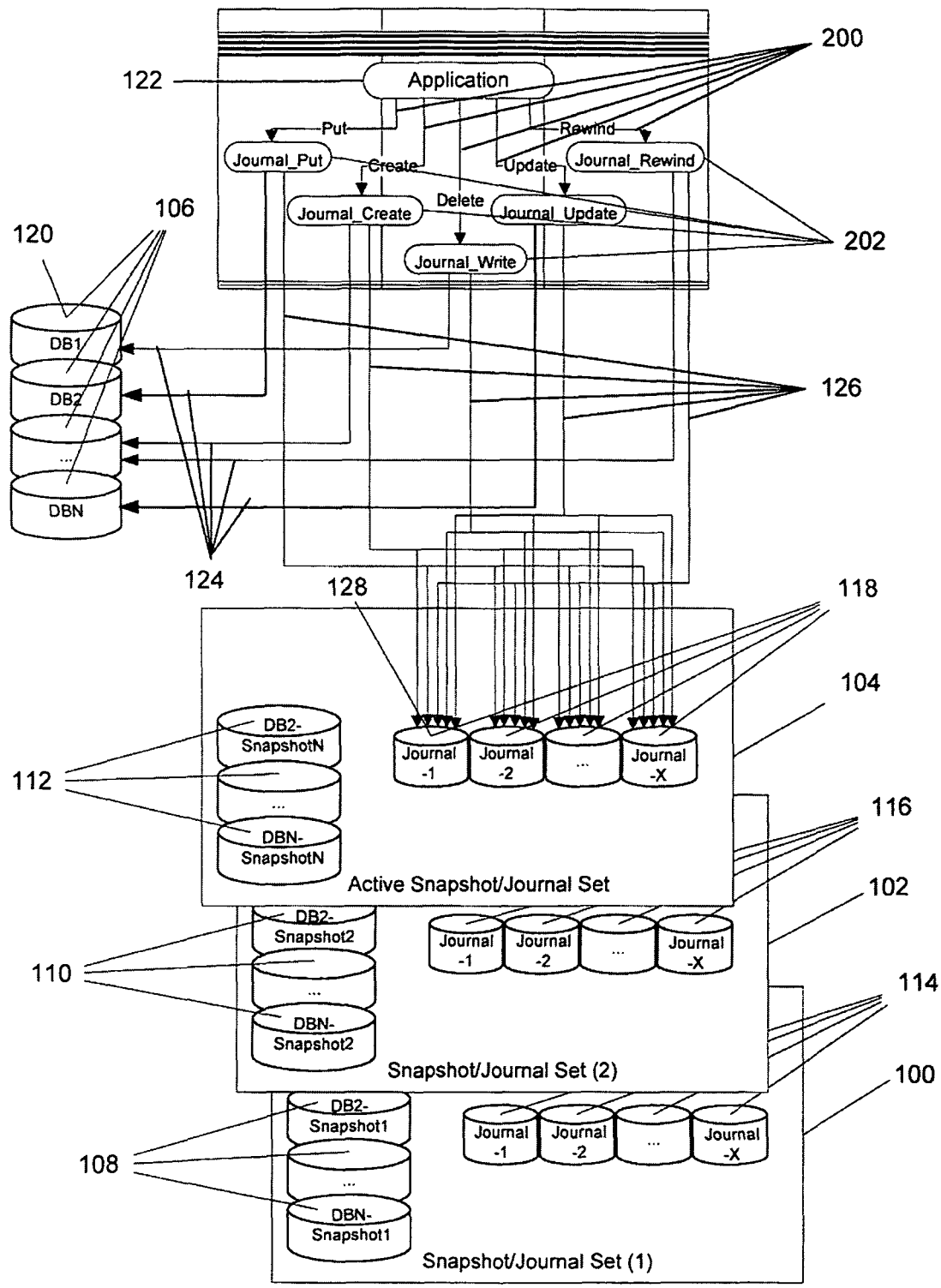
FIG. 2 depicts the journaling of the inputs/outputs (IO).

All updates to a database 124 are journaled 126. FIG. 2 depicts the journaling of the inputs/outputs (IO). This is accomplished by replacing I/O operations in an application 122 (e.g. sys$put, sys$update, . . . ) with equivalent calls 200 to Journal I/O routines 202 that take the same parameters (e.g., RABDEF, FABDEF, . . . ). Journal I/O routines 202 perform necessary actions 126 required to ensure that "Snapshot/Journal Set" 104 is appropriately maintained, along with performing original system call 124 (e.g., sys$put, sys$update, . . . ). In most cases updates 124 are in the form of record operations, however some operations are at the file level (e.g., sys$create). When an application wishes to update a database 120 it replaces the usual system I/O request with the equivalent journal I/O request 200 (e.g., sys$update is replaced by journal_update, . . . ). The journaling operation will then update 124 the desired database 120 and also update 126 the appropriate journal file 118 (failed database updates are journaled with an indication of the failure).

PourOver is configured using a configuration file, which specifies the databases to be journaled 106 (for both clusters), journal files to use 118 and the other configurable information. The journal configuration file itself is part of each snapshot 100, 102, 104. For PourOver there is the concept of the root configuration file. This file is only loaded if no snapshot has been previously taken or an explicit load command is performed. Under normal conditions the PourOver processes will load the configuration file from the currently active snapshot 104, unless specifically commanded to do otherwise.

Figure 3:
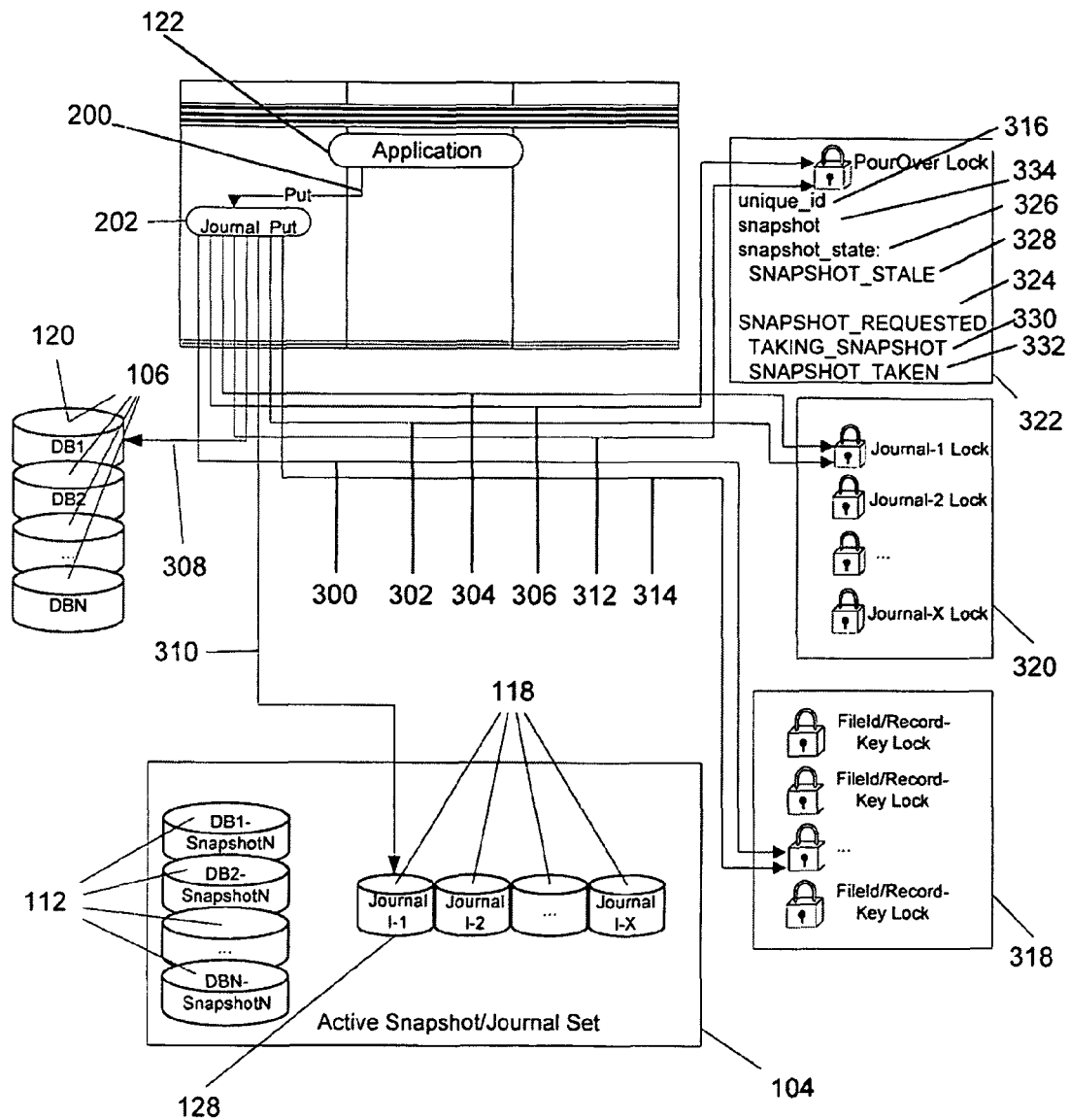
FIG. 3 shows a typical journaling operation.

In order to ensure that databases 106 can be reconstructed in a consistent manner (i.e., the reconstructed databases are identical to the original databases at some exact instance in time), it is necessary to be able to replay database updates 124 in the exact order in which they were originally made (across all processes in the cluster). FIG. 3 shows a typical journaling operation. If performance were not an issue, this could easily be accomplished just by using a single journal file and allowing VMS file locking to serialize the journal updates. However, using a single journal file severely restricts the rate at which updates can be made. The current NMC hardware would be limited to ~300 updates per second (across the cluster, assuming multiple writers). In order to achieve much higher throughput rates, the journal can be split into multiple files 118 and each subsequent journal entry put into the next available journal file (i.e., available in terms of not being locked by another process). This effectively increases I/O throughput by allowing multiple journal entries to be written simultaneously. Unfortunately, it increases the complexity of journaling by requiring a mechanism to uniquely order the entries, so that on replay missed entries can be detected. Also, to increase journaling throughput, journaling is performed on a distributed basis by the same processes that would originally have done the system call to update the databases. Due to the distributed nature of the journaling updates, a cluster wide unique ID 316 (that is monotonically increasing and unique within the snapshot set) is used to order journaling operations.

When a process wishes to update a database 106 it replaces the usual system I/O request with the equivalent journal I/O request 200 (e.g., sys$update is replaced by journal_update, . . . ). Journaling operation 202 then performs the following steps:

Get Record Lock 300. A record lock 318 is acquired for the record being modified (assuming this is a record operation). The name of record lock 318 is based upon the file ID and the key of the record being modified.

Get Journal File Lock 302. The journal file to be used for the journaling operation is locked 320.

Get PourOver lock 304. Pour over lock 322 is used to synchronize all journaled requests.

Increment the cluster wide unique ID 316 and release/update pour over lock 306. Update Database 308. Database 120 is updated (as would have been done originally).

Append Journal Entry 310. Locked journal file 128 is appended to, with just enough information to reconstruct the database update.

Release Journal File Lock 312. Journal lock 320 is released.

Release Record Lock 314. Record lock 318 is released.

The systems starts by getting record lock 300 (assuming a record oriented operation) to ensure that no other process can update the same record between the time of the database update and the journal update. This is important, since otherwise it would be possible for the entries in the journal files to be in a different order than the actual updates to the database. Next journal file lock is obtained 302. This maintains increasing record identifications (ID's) within a journal file. Once the journal file is locked the process proceeds to get pour over lock 304 to update cluster wide unique ID 316. Once the pour over lock is obtained, unique ID 316 is updated and pour over lock is released 306, journaling the transaction (updating the database and journaling the change) is performed 308 and 310. Incrementing unique ID 316 is an integral part of the transaction, since aborting anytime between incrementing the ID and journaling the operation will cause a missing ID in the journaled files and will be interpreted as a missing record on replay. Thus, making the journal/snapshot set no longer replayable beyond that point. Finally, all remaining locks 312 and 314 are released (note, the unlocking order is not necessary).

There is a potential race condition between the point in time journal lock is acquired 302 and when pour over lock is acquired 304. It is possible for another process to request a journal snapshot 324 between these operations. If a snapshot is taken after journal file lock is acquired 302 and before pour over lock is granted 304, unique ID 316 in pour over lock 322 will refer to new journal/snapshot set 104, while journal file lock 320 will refer to the pre snapshot journal file. Thus, if one were to proceed, it would journal the operation into the old journal file with an out of sequence snapshot ID. In order to resolve this race condition, journal file lock 320 must be released and reacquired whenever the snapshot number changes between the two operations.

Note, causing a missing journal ID in the case that a process crashes between updating pour over lock 322 and updating the journal file is a means to detect a failure in the critical region between the time that a database update is made and the time that the update is journaled. If a process crashes between the time that a journaled database is updated and the transaction is journaled, on replay it is not possible to reconstruct the lost transaction. Therefore, a new snapshot must be made in order to recover the missing operation. It should be noted, that by treating the moment that unique ID 316 gets updated as the start of the critical region, crashes will be detected between the pour over lock update and the database update as a critical error, even though it is not. However all crashes between the database update and journal update will be appropriately detected.

The process of journaling an I/O operation has been designed to make minimal assumptions about the processes that are using the journaling calls and the databases being journaled. The basic goal is to provide a drop in replacement for the standard I/O routines without any other modifications to the original code. Initialization of the journaling code is performed on the fly when the first journaling call is performed and further state synchronization is done either as further I/O calls are made or by asynchronous timer interrupts.

The journal entries consist of:
ID
The cluster wide unique ID associated with this journal entry.
vms_status
The vms status of the journaled operation.
error_number
The error of the journaled operation.
return_value
The return value of the journaled operation.
position
The rabs b_rfa0 or unix file position, for the journaled operation (if any).
nmemb
The nmemb parameter for a journaled fwrite.
size
The size of the record being journaled (if any).
existing_size
The size of any existing record (if any).
operation
The type of operation being performed:
    JOURNAL_SYS_PUT
    JOURNAL_SYS_UPDATE
    JOURNAL_SYS_DELETE
    JOURNAL_SYS_REWIND
    JOURNAL_SYS_OPEN
    JOURNAL_SYS_CREATE
    JOURNAL_SYS_ERASE
    JOURNAL_FDL_CREATE
    JOURNAL_OPEN
    JOURNAL_REMOVE
    JOURNAL_RENAME
    JOURNAL_FWRITE
w_rfa4
The rabs w_rfa4 of the journaled operation (if any).
filename_index
The db filename index of the journaled operation.
b_ksz
The rabs b_ksz of the journaled operation (if any).
b_rac
The rabs b_rac of the journaled operation (if any).
b_krf
The rabs b_krf of the journaled operation (if any).
wildnameSize
The length of the wildcard name. If non-zero the database is a wildcard and the name of the database is appended to the header.
<key>
The key (if any) associated with the journaled operation (e.g., used for sys$delete).
<existing-record>
The existing record to be updated/deleted (if any).
<data>
The data (if any) associated with the journaled request (e.g., used for sys$put)
<wildname>
The name of the database file when it is defined as a wildcard in the configuration file.

Figure 4:
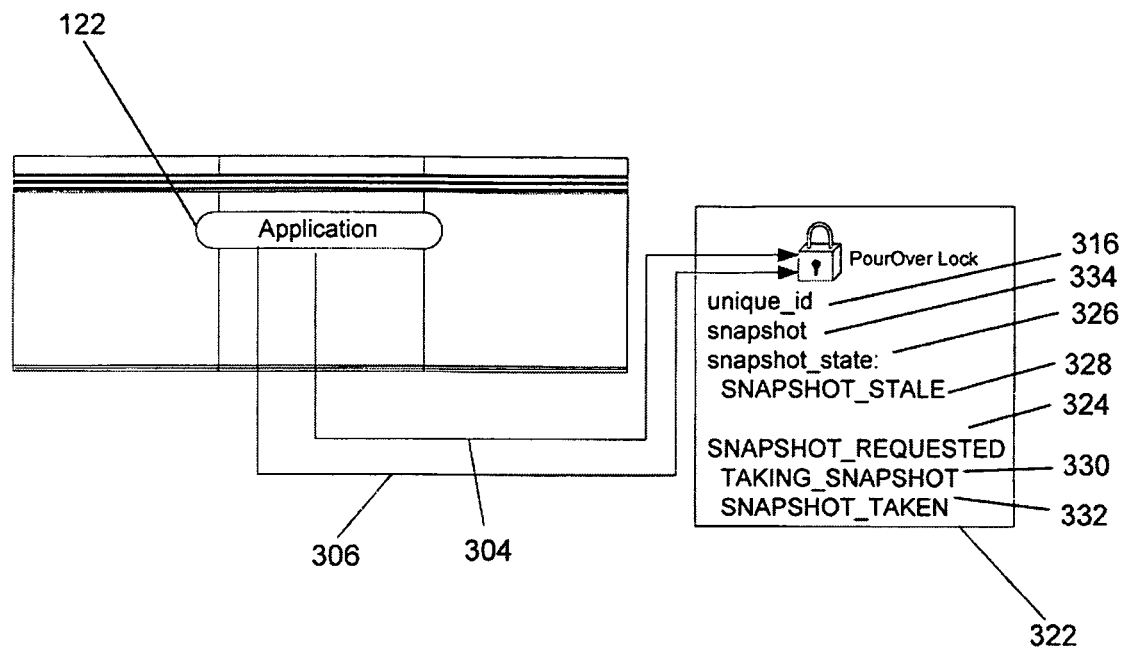
FIG. 4 shows a typical snapshot request.

FIG. 4 shows a typical snapshot request. A snapshot is requested by an application 122 getting a write lock 304 on the pour over lock 322 and updating the associated field in its' lock block:
unique_ID 316
Reset to zero and a continuation flag is set so that consistency with the previous snapshot journal files can be determined.
snapshot 334
Increment the snapshot ID. Each "Snapshot/Journal Set" has a unique ID that distinguishes it from the others.
snapshot_state 326
Set to SNAPSHOT_REQUESTED 324. This flags the snapshot process to take a snapshot of the databases.

Once the lock block is updated, the application applies the change across the cluster by releasing write lock 306 on pour over lock 322. The very next process to obtain a write lock on pout over lock 322 will get the modified values and in turn proceed to make any journaling updates into the journal files associated with the updated snapshot ID (regardless of whether or not the snapshot process has begun to make a snapshot of the underlying databases).

Figure 5:
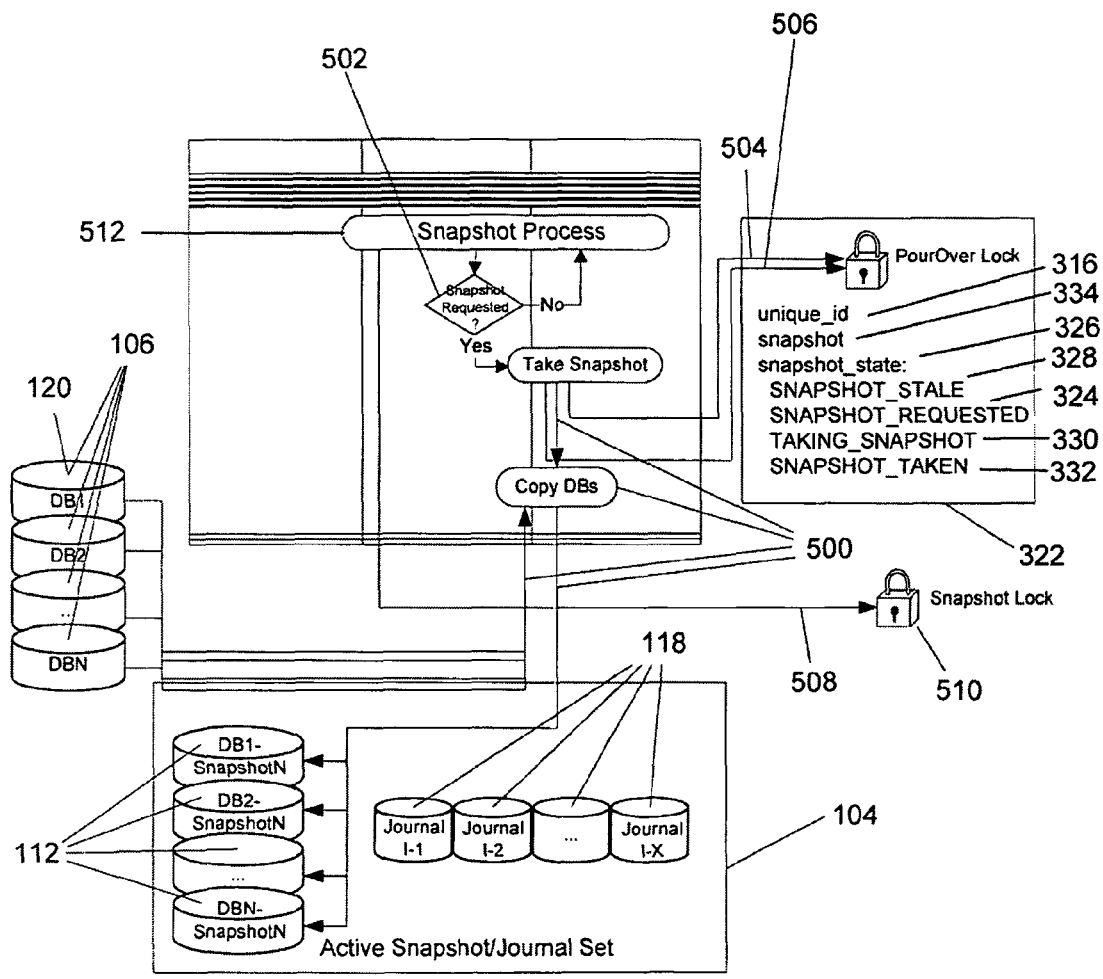
FIG. 5 shows how a typical snapshot is processed.

FIG. 5 shows how a typical snapshot is processed. Making a snapshot simply consists of copying each database 106 into active "Snapshot/Journal Set" 104, in a manner that retains the record management services (RMS) attributes and integrity of the file. Making a snapshot of the databases is managed by a single snapshot process 512, though many such processes are likely to be running. At startup each snapshot process 512 attempts to gain control 508 of snapshot lock 510. Any process that gains control of snapshot lock 510 will be the snapshot master, and hence be responsible for making any snapshots. If the master process dies, its' snapshot lock 510 will be released and whatever process gains control of snapshot lock 510 will become the new master. The non-master processes just wait to gain control of snapshot lock 510 and become the master. Master process waits 502 for snapshot_state 326 in pour over lock 322 to become SNAPSHOT_REQUESTED 324 (immediately after obtaining lock TAKING_SNAPSHOT 330 will also cause a snapshot to be taken), and when the change is detected the master snapshot process will change the state to TAKING_SNAPSHOT 330, 504 and proceed to make a snapshot 500 of databases 106. Once the database snapshots are complete, the master process will change snapshot_state 326 back to SNAPSHOT_TAKEN 332, 506 to indicate that the snapshot process is complete and another snapshot may be taken at any time. Note that snapshot_state 326 is initialized to SNAPSHOT_STALE 328, to indicate prior to the first snapshot being requested after all of the systems in a cluster have been taken down that any existing snapshots are stale and the databases may have been modified offline.

Between snapshot requests the snapshot process may choose to stream active snapshot journal set's 104 journal files 118 looking for a missing record (i.e., a process crashed in a critical region while journaling). If a missing record is detected, snapshot process 512 will itself request that a new snapshot be taken. Snapshot process 512 will also request a new snapshot based upon the time interval between snapshots exceeding a maximum interval and/or number of records.

Figure 6:
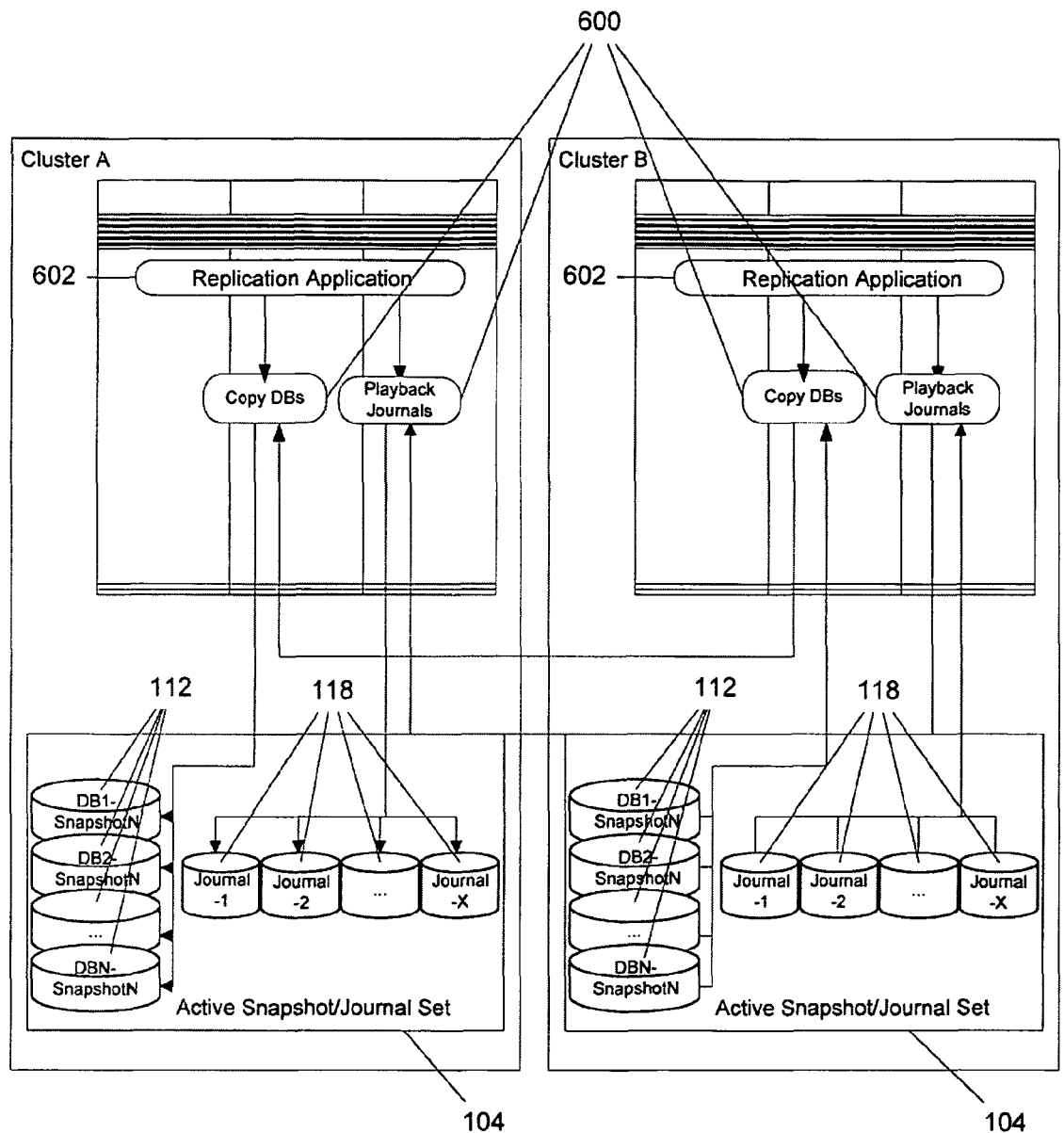
FIG. 6 depicts the process of inter cluster replication.

FIG. 6 depicts the process of inter cluster replication. Replicating a "Snapshot/Journal Set" 104 across clusters is very similar to restoring the databases and involves a replication application 602 simply copying 600 databases 112 and journal files 118 from one cluster to the other. As with taking a database snapshot, the RMS attributes and integrity of the file must be maintained. Also, in the case of journal files 118, the records are streamed (i.e., the records are read and written across the cluster even as the journal file is being appended to). If during replication a record is missing, which is detected by an out of sequence ID, the replication should abandon the current snapshot and move on to the next one.

Figure 7:
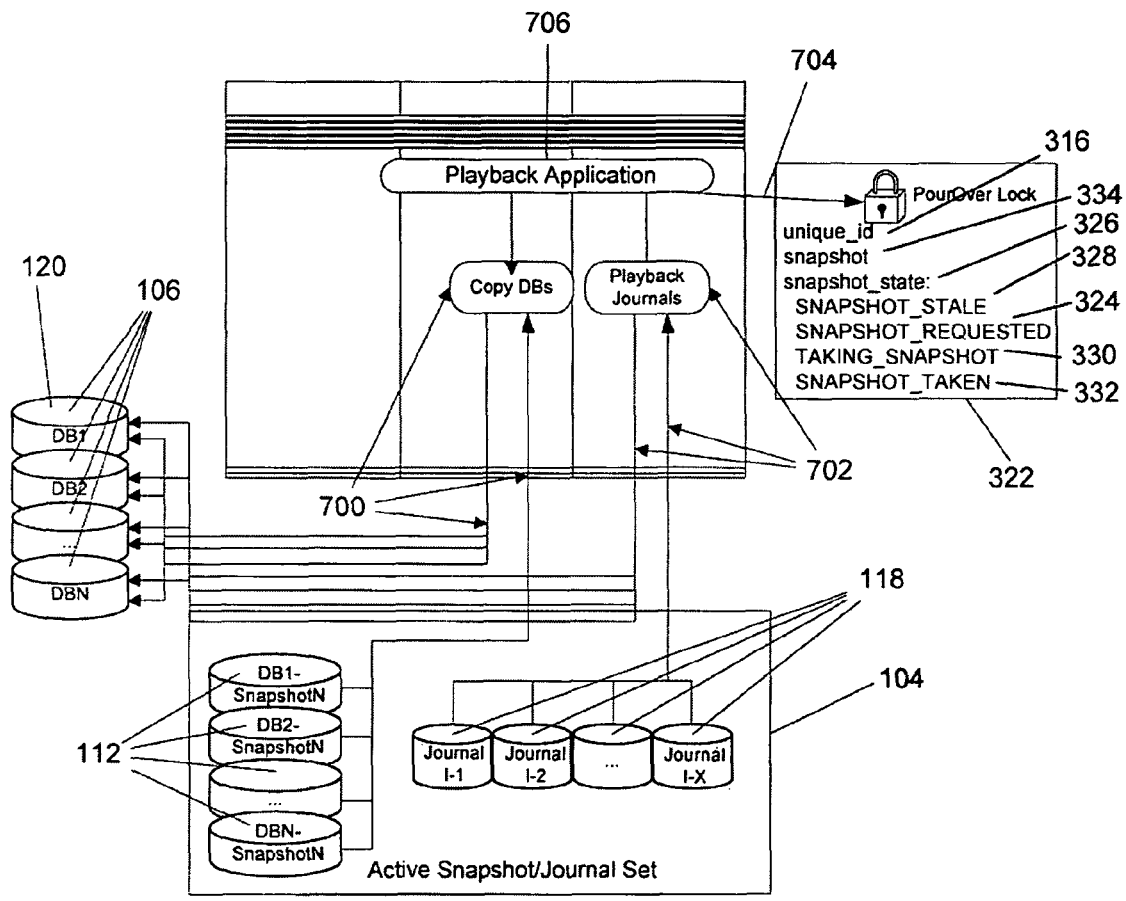
FIG. 7 is a depiction of how the journal is played back.

FIG. 7 is a depiction of how the journal is played back, using a playback application 706. Replaying a snapshot is nearly the inverse of creating a "Snapshot/Journal Set". Instead of copying databases 106 to snapshot set 104, 112 and appending entries to journal files 118 sequentially, databases 112 are copied 700 from snapshot set 104 to their appropriate locations on databases 106 and journal files 118 and are read sequentially and the described changes are applied 702 to the database files 106. The process of playback starts with getting an exclusive pour over lock 322, 704. This is to ensure that no other processes are modifying the databases/journal files during a restore. Once the exclusive lock is obtained, the snapshotted databases are copied back to their original/equivalent locations 700. Then the journal files are read and the updates specified are applied to the restored database files 702. If during playback a record is missing, which is detected by a missing ID, the playback must halt. Otherwise, the restored database and subsequent operations will become out of synch with the original database. However, all the changes up to the point of the missing record will be consistent and the databases in a consistent state up to that point. In order to get past the missing record a new snapshot must be taken and a new set of journal files created.

Figure 8:
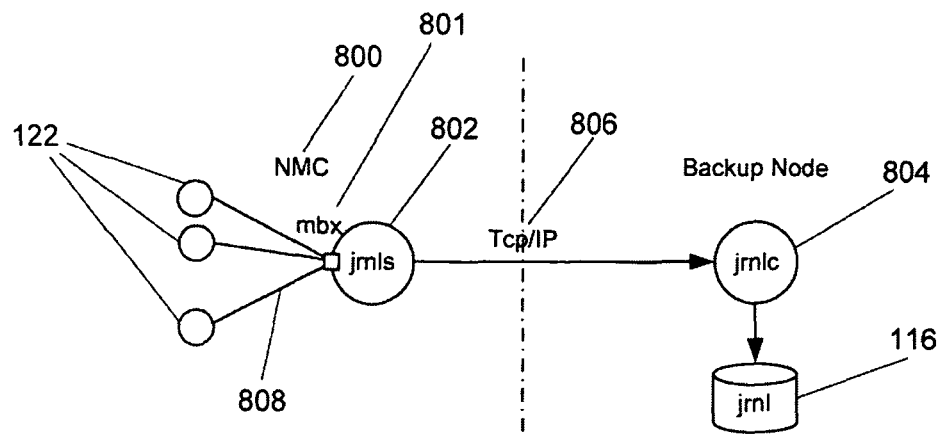
FIG. 8 shows a second implementation of the present invention.

FIG. 8 depicts a second implementation of the present invention. In this implementation NMC 800 communicates with JRNLS 802 using VMS mailboxes 801 and JRNLS 802 communicates with JRNLC 804 over TCP/IP connections 806.

Figure 9:
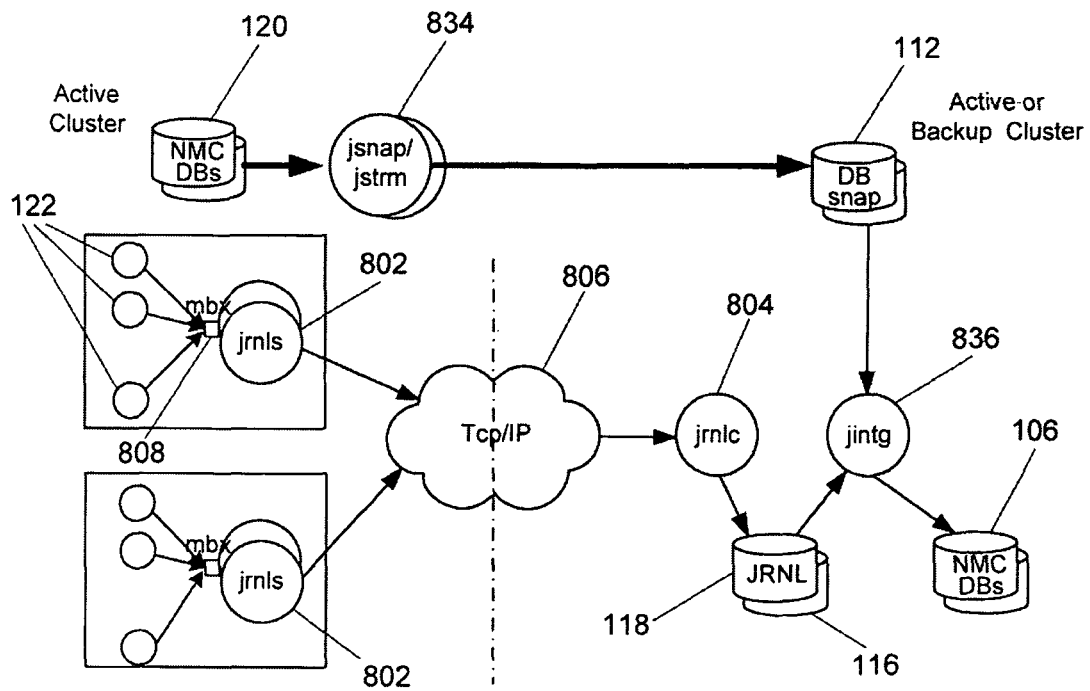
FIG. 9 is a functional diagram showing the implementation of FIG. 8.
Figure 10:
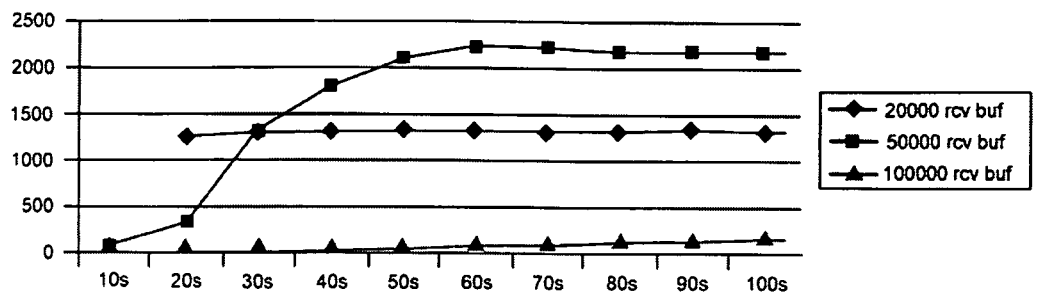
FIG. 10 is a graph showing the ramp-up speeds and peak rates for a single TCP connection using the current Multinet stack.

FIG. 9 is a functional diagram showing the implementation of FIG. 8. JRNLS 802 transfers journal records to JRNLC 804 over a TCP connection 806. On a new connection TCP goes through slow start phase before providing full throughput. This results in a ramp-up to the peak link speed. FIG. 10 is a graph showing the ramp-up speeds and peak rates for a single TCP connection using the current multinet stack. The X axis shows time in seconds and the Y axis shows packet rate per second for packets of size 1000 bytes. For smaller receive buffers the ramp-up is faster, but the peak rate is lower, compared to a bigger buffer where the ramp-up is relatively slower with a higher peak rate.

Since the journaling stream is not flow controlled at the source, it is preferred to use a smaller receive buffer so that the ramp-up is faster. This will limit the peak rate on a single TCP connection 806. Higher peak rates can be achieved by streaming over multiple TCP connections. Because of the nature of TCP connections 806, JRNLS 802 will have a buffer to store journal records to accommodate temporary slowness in TCP connections 806 due to ramp-ups. To get better peak rates than a single connection can support, multiple JRNLSs should be run.

Figure 11:
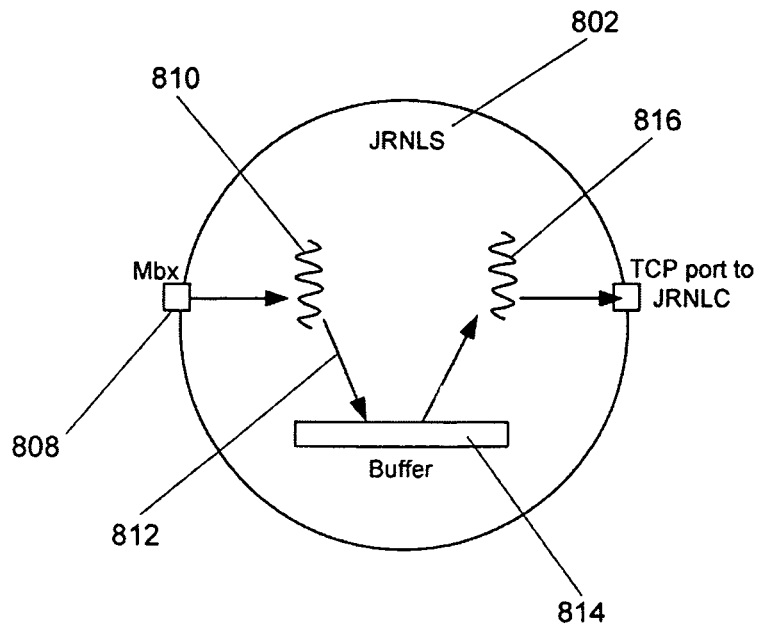
FIG. 11 is a diagram showing JRNLS receiving journal records and placing it in a memory buffer.
Figure 12:
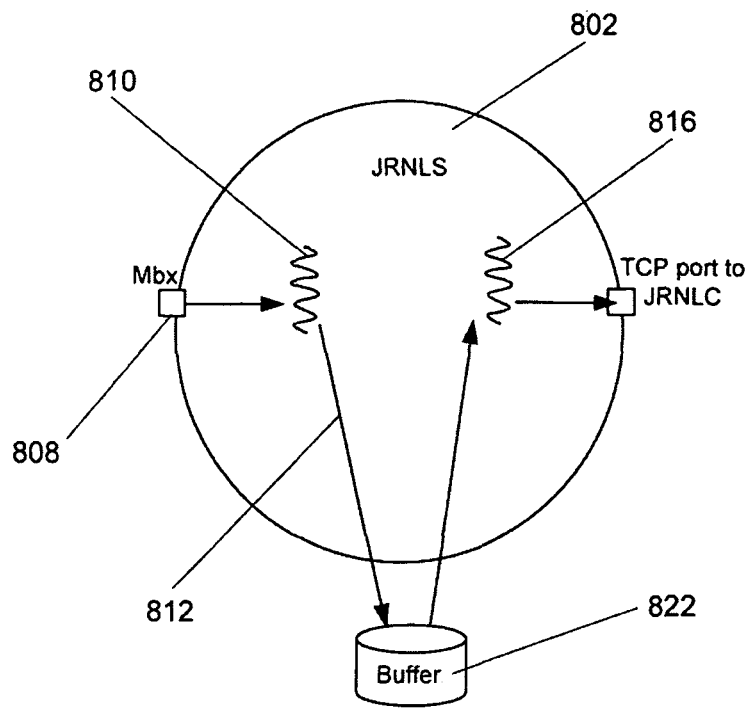
FIG. 12 is a diagram similar to FIG. 11, showing the mail being placed in a file buffer.

JRNLS 802 receives journal records from NMC applications via mailbox (Mbx) 808. FIG. 11 is a diagram showing JRNLS 802 receiving journal records and placing them in a memory buffer. FIG. 12 is a diagram showing the mail being placed in a file buffer. As shown in FIGS. 11 and 12, one thread 810 receives mail 812 and places it in a buffer 814, 822. Another thread 816 removes mail 812 from buffer 814 and sends it to JRNLC 818 via TCP connection 820. Note that the thread is just conceptual execution sequence and is implemented by way of the standard NMC event loop.

A TCP write can sometimes take up to 500 ms, so 'blocking TCP writes' cannot be used because it could result in dropped mail packets as the mail stream from NMC applications is not flow-controlled. JRNLS uses asynchronous/non-blocking TCP writes so as to return immediately to the event loop to process the mailbox, while TCP write is going in parallel.

In most cases where the network link is congestion free and reliable, a memory buffer 814 as shown in FIG. 11 will be sufficient. But in cases where the necessary memory cannot be allocated or the memory required is not reasonable because of the quality of the network link, a file buffer 822, as shown in FIG. 12, can be used.

If the necessary throughput cannot be attained, then multiple JRNLSs can be started. JRNLS will be able to handle quick and temporary network glitches by re-transmitting journal records from the buffer. JRNLC will be able to handle duplicate journal records. A re-transmit index will be used in JRNLS to point to the journal record in the buffer from where the re-transmit begins.

Figure 13:
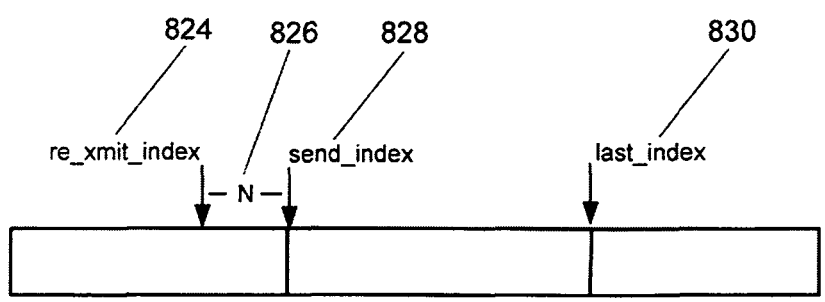
FIG. 13 is a graphic representation of JRNLS being retransmitted on temporary glitches.

FIG. 13 is a graphic representation of JRNLS being retransmitted on temporary glitches. Re-transmit index (re_xmit_index) 824 is at-least N bytes 826 behind send_index 828, where send_index 828 points to the beginning of the bytes yet to be sent. On a quick network glitch, after the connection is re-established, send_index 828 is set to re_xmit_index 824. N 826 has to be greater than the sum of TCP send buffer in JRNLS 802 & TCP 820 receive buffer in JRNLC 818. Last_index 830 points to the last of the bytes yet to be sent. In case of file-buffer the record file address will serve the purpose of the re-transmit index. In case of re-connects, a file seek is performed to the re-transmit record file address.

Figure 14:
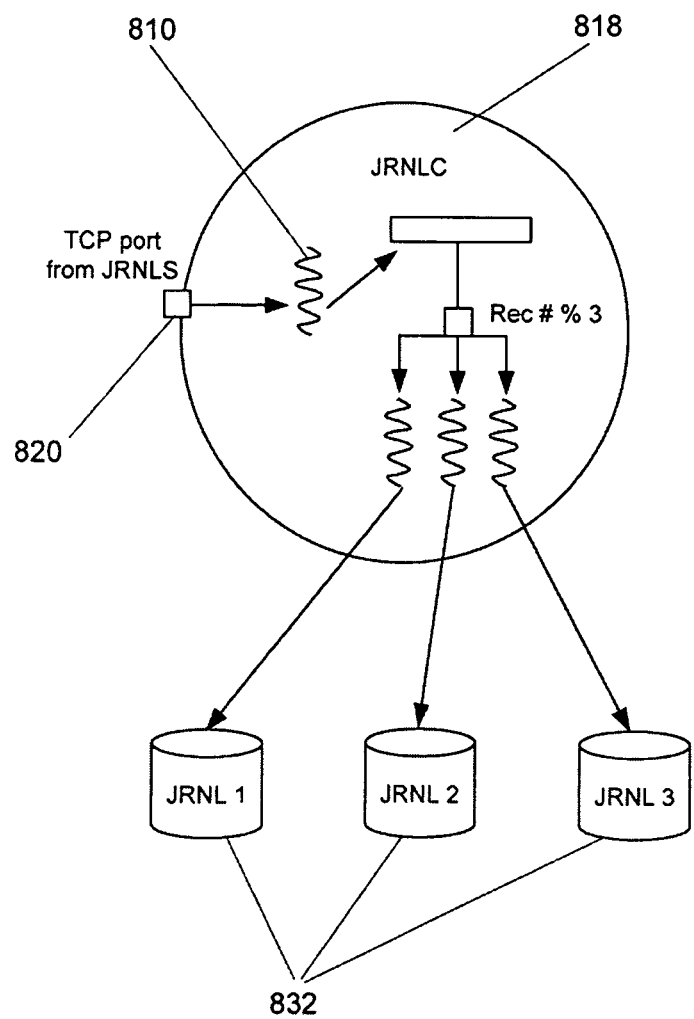
FIG. 14 is a diagram showing JRNLC writing to three journal files.

FIG. 14 is a diagram showing JRNLC writing to three journal files. JRNLC 818 receive the journal records from multiple JRNLSs 802 over TCP connections 820. JRNLC 818 coalesces the records into a right order and writes to JRNL file 832. JRNLC 818 has one thread reading from TCP connections 820 and another thread writing to JRNL file 832. Writing to JRNL files 832 synchronously creates an artificial processing delay. Any processing latency will slow down TCP connections 820 by way of TCP window advertisements and will impact throughput. This could result in the record stream backing up to JRNLS 802 and the buffer filling at JRNLS. To avoid unnecessary processing delays, JRNLC 818 writes to JRNL files 832 asynchronously. JRNLC 818 allows configuring multiple JRNL files 832 to be written to. In case of multiple files, JRNLC 818 chooses the file to write to, by performing a 'mod' on the record number—rec_num# % N, where N is the total number of files to write to. This simple mechanism will make it easy for JINTG 836 to read from multiple files in the same manner.

Multiple journal files should be used only if they can leverage parallel use of multiple spindles or disc groups. In order to keep the journal record stream processing lean (to prevent any latency) JRNLS 802 and JRNLC 818 will avoid performing lengthy operations. So, JRNLS 802 will delegate any lengthy processing to JSTRM 834 on the same gateway. Because of this, JSTRM 834 will become a necessary process on every gateway. To avoid latency problems JRNLC 818 does not load the journal configuration file. This moves some of the functionality, which is performed in the first implementation from the JRNLC 818 into JINTG 836.

The processes running on the remote node will also support local mode. In this mode end-to-end journaling can be performed on the same cluster. This will be supported for sites which don't have a backup node and have resources to support journaling on the local nodes.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present invention. Various modifications to these implementations will be readily apparent to those skilled in the art, and the generic principles defined herein may be applied to other implementations without departing from the scope of the invention. Thus, the present invention is not intended to be limited to the implementations shown herein but is to be accorded the widest scope consistent with the principles and novel features disclosed herein.

What is claimed is:

1. A method for replicating near real-time transaction data and disc based database files in a distributed system to a backup, the method comprising the steps of:

receiving, at the backup, a snapshot of a plurality of distributed databases, wherein the snapshot is received on a periodic basis, the periodic basis including a timed basis or a specific number of records entered into the plurality of distributed databases, and wherein at least two distributed databases of the plurality of distributed databases store inter-related data;

replicating the plurality of distributed databases in the backup from the snapshot to build replicated databases;

receiving streamed transaction updates for the plurality of distributed databases subsequent to taking the snapshot, wherein the transaction updates are associated with unique identifiers that indicate a sequential order of the transaction updates;

assembling the transaction updates into sequential transaction updates in an order based on the unique identifiers associated with the transaction updates;

validating an integrity of the order of the sequential transaction updates;

simultaneously writing two or more of the validated sequential transaction updates in the sequential order into separate files of a journal; and applying the validated sequential transaction updates from the separate files of the journal in the order to the replicated databases, wherein the validated sequential transaction updates are streamed to the replicated databases even as additional updates are occurring to the transaction updates.

2. The method of claim 1, wherein the step of receiving a snapshot comprises receiving a snapshot when the sequential transaction updates are invalid.

3. The method of claim 1, wherein receiving transaction updates further comprises receiving the transaction updates via at least one network connection.

4. The method of claim 1, further comprising restoring the plurality of distributed databases from the replicated databases at a specific point in time.

5. The method of claim 1 wherein the backup comprises a remote site.

6. The method of claim 1 wherein the step of replicating comprises replicating across clusters.

7. The method of claim 1, wherein the plurality of the distributed databases include different versions of the same database located in different clusters.

8. The method of claim 1, further comprising:
deleting the snapshot and the journal upon receiving a second snapshot of the plurality of distributed databases.

9. A system for replicating near real-time transaction data and disc based database files in a distributed system to a backup, the system comprising:
means for receiving, at the backup, a snapshot of a plurality of distributed databases, wherein the snapshot is received on a periodic basis, the periodic basis including a timed basis or a specific number of records entered into the plurality of distributed databases, and wherein at least two distributed databases of the plurality of distributed databases store inter-related data;
means for replicating the plurality of distributed databases in the backup from the snapshot to build replicated databases;
means for receiving streamed transaction updates for the plurality of distributed databases subsequent to taking the snapshot, wherein the transaction updates are associated with unique identifiers that indicate a sequential order of the transaction updates;
means for assembling the transaction updates into sequential transaction updates in an order based on the unique identifiers associated with the transaction updates;
means for validating an integrity of the order of the sequential transaction updates;
means for simultaneously writing two or more of the validated sequential transaction updates in the sequential order into separate files of a journal; and
means for applying the validated sequential transaction updates from the separate files of the journal in the order to the replicated databases, wherein the validated sequential transaction updates are streamed to the replicated databases even as additional updates are occurring to the transaction updates.

10. The system of claim 9 wherein the means for receiving a snapshot comprises a means for receiving a snapshot when the sequential transaction updates are invalid.

11. The system of claim 9, wherein the means for receiving transaction updates further comprises means for receiving the out of order transaction updates via at least one network connection.

12. The system of claim 9, further comprising means for restoring the plurality of distributed databases from the replicated databases at a specific point in time.

13. The system of claim 9 wherein the backup comprises a remote site.

14. The system of claim 9 wherein the means for replicating comprises a means for replicating across clusters.

15. The system of claim 9, wherein the plurality of the distributed databases include different versions of the same database located in different clusters.

16. The system of claim 9, further comprising:
means for deleting the snapshot and the journal upon receiving a second snapshot of the plurality of distributed databases.

17. A computer program product, comprising:
computer readable storage medium storing code that causes one or more processors to replicate near real-time transaction data and disc based database files in a distributed system to a backup, the computer code comprising:
code for causing at least one of the processors to receive, at the backup, a snapshot of a plurality of distributed databases, wherein the snapshot is received on a periodic basis, the periodic basis including a timed basis or a specific number of records entered into the plurality of distributed databases, and wherein at least two distributed databases of the plurality of distributed databases store inter-related data;
code for causing at least one of the processors to replicate the plurality of distributed databases in the backup from the snapshot to build replicated databases;
code for causing at least one of the processors to receive streamed transaction updates for the plurality of distributed databases subsequent to taking the snapshot, wherein the transaction updates are associated with unique identifiers that indicate a sequential order of the transaction updates;
code for causing at least one of the processors to assemble the transaction updates into sequential transaction updates in an order based on the unique identifiers associated with the transaction updates;
code for causing at least one of the processors to validate an integrity of the order of the sequential transaction updates;
code for causing at least one of the processors to simultaneously write two or more of the validated sequential transaction updates in the sequential order into separate files of a journal; and
code for causing at least one of the processors to apply the validated sequential transaction updates from the separate files of the journal in the order to the replicated databases, wherein the validated sequential transaction updates are streamed to the replicated databases even as additional updates are occurring to the transaction updates.

18. The computer program product of claim 17, further comprising code for causing at least one of the processors to receive a snapshot when the sequential transaction updates are invalid.

19. The computer program product of claim 17, further comprising code for causing at least one of the processors to receive the transaction updates via at least one network connection.

20. The computer program product of claim 17, further comprising code for causing the plurality of distributed databases to be restored from the replicated databases at a specific point in time.

21. The computer program product of claim 17 wherein the backup comprises a remote site.

22. The computer program product of claim 17 wherein the code for causing the at least two distributed databases in the backup be replicated comprises code for causing the replication across clusters.

23. The computer program product of claim 17, further comprising:
code for causing at least one of the processors to delete the snapshot and the journal upon receiving a second snapshot of the plurality of distributed databases.

24. An apparatus for replicating near real-time transaction data and disc based database files in a distributed system to a backup, the apparatus comprising:
a snapshot component comprising a replication application operable to:
receive, at the backup, a snapshot of a plurality of distributed databases, wherein the snapshot is received on a periodic basis, the periodic basis including a timed basis or a specific number of records entered into the plurality of distributed databases, and wherein at least two distributed databases of the plurality of distributed databases store inter-related data;
replicate the plurality of distributed databases in the backup from the snapshot to build replicated databases;
receive streamed transaction updates for the plurality of distributed databases subsequent to taking the snapshot, wherein the transaction updates are associated with unique identifiers that indicate a sequential order of the transaction updates;
assemble the transaction updates into sequential transaction updates in an order based on the unique identifiers associated with the transaction updates;
validate an integrity of the order of the sequential transaction updates;
simultaneously write two or more of the validated sequential transaction updates in the sequential order into separate files of a journal; and
apply the validated sequential transaction updates from the separate files of the journal in the order to the replicated databases, wherein the validated sequential transaction updates are streamed to the replicated databases even as additional updates are occurring to the transaction updates.

25. The apparatus of claim 24, wherein the snapshot component is further operable to receive a snapshot when the sequential transaction updates are invalid.

26. The apparatus of claim 24, wherein the snapshot component is further operable to receive the transaction updates via at least one network connection.

27. The apparatus of claim 24, further comprising:
a restoring component operable to restore the plurality of distributed databases from the replicated databases at a specific point in time.

28. The apparatus of claim 24, wherein the backup comprises a remote site.

29. The apparatus of claim 24, wherein the snapshot component is further operable to replicate across clusters.

30. The computer program product of claim 17, wherein the plurality of the distributed databases include different versions of the same database located in different clusters.

31. The apparatus of claim 24, further comprising:
delete the snapshot and the journal upon receiving a second snapshot of the plurality of distributed databases.

* * * * *